United States Patent [19]

Ichikawa et al.

[11] Patent Number: 5,707,023
[45] Date of Patent: Jan. 13, 1998

[54] APPARATUS FOR ESTABLISHING ELECTRICAL CONNECTION BETWEEN ROTOR AND FIXED MEMBER

[75] Inventors: Hidehiro Ichikawa; Nobuhiko Suzuki; Takuji Kinoshita, all of Shizuoka-ken, Japan

[73] Assignee: Yazaki Corporation, Tokyo, Japan

[21] Appl. No.: 640,656

[22] Filed: May 1, 1996

[30] Foreign Application Priority Data

May 2, 1995 [JP] Japan .................................. 7-108485

[51] Int. Cl.[6] .................... B65H 23/087; H01R 35/00; H01R 39/02
[52] U.S. Cl. ............................................. 242/388; 439/15
[58] Field of Search .................................. 242/388, 378, 242/402; 439/4, 13, 15

[56] References Cited

U.S. PATENT DOCUMENTS

| 4,921,428 | 5/1990 | Sasaki et al. | 439/15 |
| 5,219,460 | 6/1993 | Kato et al. | 439/164 |
| 5,252,085 | 10/1993 | Kato et al. | 439/15 |
| 5,277,604 | 1/1994 | Ida et al. | 439/15 |
| 5,409,389 | 4/1995 | Shibata et al. | 439/15 |

FOREIGN PATENT DOCUMENTS

| 0401028 | 12/1990 | European Pat. Off. . |
| 0591730A1 | 4/1994 | European Pat. Off. . |
| 96106908 | 6/1997 | European Pat. Off. . |
| 4-333473 | 11/1992 | Japan . |
| 5-53183 | 7/1993 | Japan . |

Primary Examiner—John M. Jillions
Attorney, Agent, or Firm—Finnegan, Henderson, Farabow, Garrett & Dunner, L.L.P.

[57] ABSTRACT

A housing and a rotor are electrically connected to each other by the flexible flat cable accommodated in an annular space formed between the housing and the rotor; an opening portion of a carrier disposed in the annular space and having a C-shape in a plan view is formed to allow an inversion portion of the flexible flat cable to pass through; and a lubricating members are provided for the sliding surfaces of the carrier.

5 Claims, 7 Drawing Sheets

APPARATUS FOR ESTABLISHING ELECTRICAL CONNECTION BETWEEN ROTOR AND FIXED MEMBER

BACKGROUND OF THE INVENTION

The present invention relates to an apparatus for establishing the electrical connection between a rotor and a fixed member such that the fixed member and the rotor disposed in the fixed member are connected to each other by a flexible flat cable (hereinafter abbreviated as an "FFC") disposed in an annular space formed between the fixed member and the rotor. More particularly, the present invention relates to an improvement in the structure of a carrier through which a portion of the FFC, in which the winding direction of the FFC is inverted, passes.

In recent years, a trend of electronically controlling automobiles results in steering wheels of steering apparatuses of the automobiles being provided with various switches for performing electronic controls. The foregoing switches must be connected to a steering column portion by electric wiring. Since the steering wheel of the automobile is set to be capable of rotating to the right and left plural times, the rotational shaft of the steering wheel and the steering column are electrically connected to each other by an apparatus for establishing the electrical connection between a rotor and a fixed member having a structure such that an FFC generally having a plurality of conduction wires is spirally disposed between a rotor secured to the steering shaft and a fixed member secured to the steering column portion.

As an apparatus for establishing the electrical connection between the rotor and the fixed member of the foregoing type, an apparatus disclosed in Japanese Utility-Model Laid-Open No. 5-53183 or Japanese Patent Laid-Open No. 4-333473 has been known which comprises a carrier called a guide ring or a movable member and formed into a C-shape in a plan view.

The apparatus disclosed in Japanese Utility-Model Laid-Open No. 5-53183 has a structure such that an annular guide ring (a carrier) having a cut portion is disposed in an annular space formed between an inner case and an outer case which rotate mutually; and the inversion portion of the FFC is allowed to pass through the cut portion. The two ends of the FFC are secured to the inner case and the outer case. If the inner case is rotated, for example, counterclockwise, the portion of the FFC wound around the inner case is unwound, and then wound around the inner surface of the outer case. If the inner case is rotated, for example, clockwise, the portion of the FFC wound around the inner surface of the outer case is unwound, and then the unwound portion is wound around the outer surface of the inner case. At this time, the inversion portion of the FFC pushes the end surface of the cut portion of the guide ring so as to rotate and move the guide ring.

Also a means has been disclosed which comprises a spring member or an elastic member attached to the guide ring to push the FFC to the outer surface of the rotor so as to prevent loosening of the FFC.

In Japanese Patent Laid-Open No. 4-333473, a means has been disclosed which comprises a lubricating member disposed on each of the inner and outer surfaces of the movable member (carrier) so as to weaken frictional resistance. However, the conventional apparatus for establishing the electrical connection between the rotor and the fixed member involves the carrier being easily deviated vertically or in the radial direction when the carrier is rotated and moved or due to external vibrations. As a result, the carrier is brought into contact with the inner surface of the fixed member, thus resulting in vibration noise being generated. Moreover, sliding noise is generated due to sliding with respect to the fixed member when the rotation and movement are performed. Although the structure, in which the spring member or the like is attached to the carrier to push the FFC to the outer surface of the rotor or the inner surface of the fixed member, is able to somewhat prevent the radial directional deviation of the carrier, the foregoing structure involves the sliding resistance of the carrier being strengthened due to the spring member or the like. As a result, excess stress acts on the FFC and, thus, there arises a problem of buckling of the FFC.

SUMMARY OF THE INVENTION

In view of the foregoing, an object of the present invention is to provide an apparatus for establishing the electrical connection between a rotor and a fixed member which is capable of preventing generation of vibration noise and sliding noise from a carrier (a movable member) while protecting a flexible flat cable from excess stress. To achieve this, an apparatus for establishing the electrical connection between a rotor and a fixed member according to the present invention has a structure such that a rotor is rotatively disposed in a fixed member, a flexible flat cable having an end secured to the fixed member and another end secured to the rotor is accommodated in an annular space formed between the fixed member and the rotor, direction of winding of the flat cable is, at an intermediate inversion portion of the flat cable, inverted to be opposite such that the flat cable is wound around the outer surface of the rotor and then the flat cable is wound around the inner surface of the fixed member, a movable member is disposed in the annular space, the movable member being arranged to be rotated and moved with respect to rotation of the rotor due to movement of the inversion portion in the circumferential direction caused by winding operation around the outer surface of the rotor or the inner surface of the fixed member, and the movable member is formed into an annular shape having an opening formed in a portion thereof, the opening being arranged to allow the inversion portion to pass through, the apparatus for establishing the electrical connection between a rotor and a fixed member comprising: lubricating means provided on sliding surfaces of the movable member with respect to the fixed member.

The lubricating means may be formed by coating with a lubricating material or by applying lubricating sheets, or the lubricating means may consist of one or more ribs formed concentrically with the movable member.

As a result, when the rotor performs a reciprocating operation and the movable member is rotated and moved through the inversion portion of the FFC, the movable member smoothly slides on the upper and lower surfaces of the fixed member thanks to the lubricating means. Therefore, when the lubricating means and the fixed member come in contact with each other, generation of sliding noise can be prevented, looseness can be prevented, and generation of vibration noise can be prevented.

The movable member may be formed into a hollow annular shape composed of a plate-like side wall, and the lubricating means is provided for each of the upper and lower surfaces of the movable member.

As a result, the movable member coated with the lubricating material is able to smoothly slide along the upper and lower surfaces of the fixed member. As a result, generations of sliding noise and vibration noise can be prevented.

DESCRIPTION OF THE PREFERRED EMBODIMENT

Preferred embodiments of the present invention will now be described with reference to the drawings.

Figure 1:
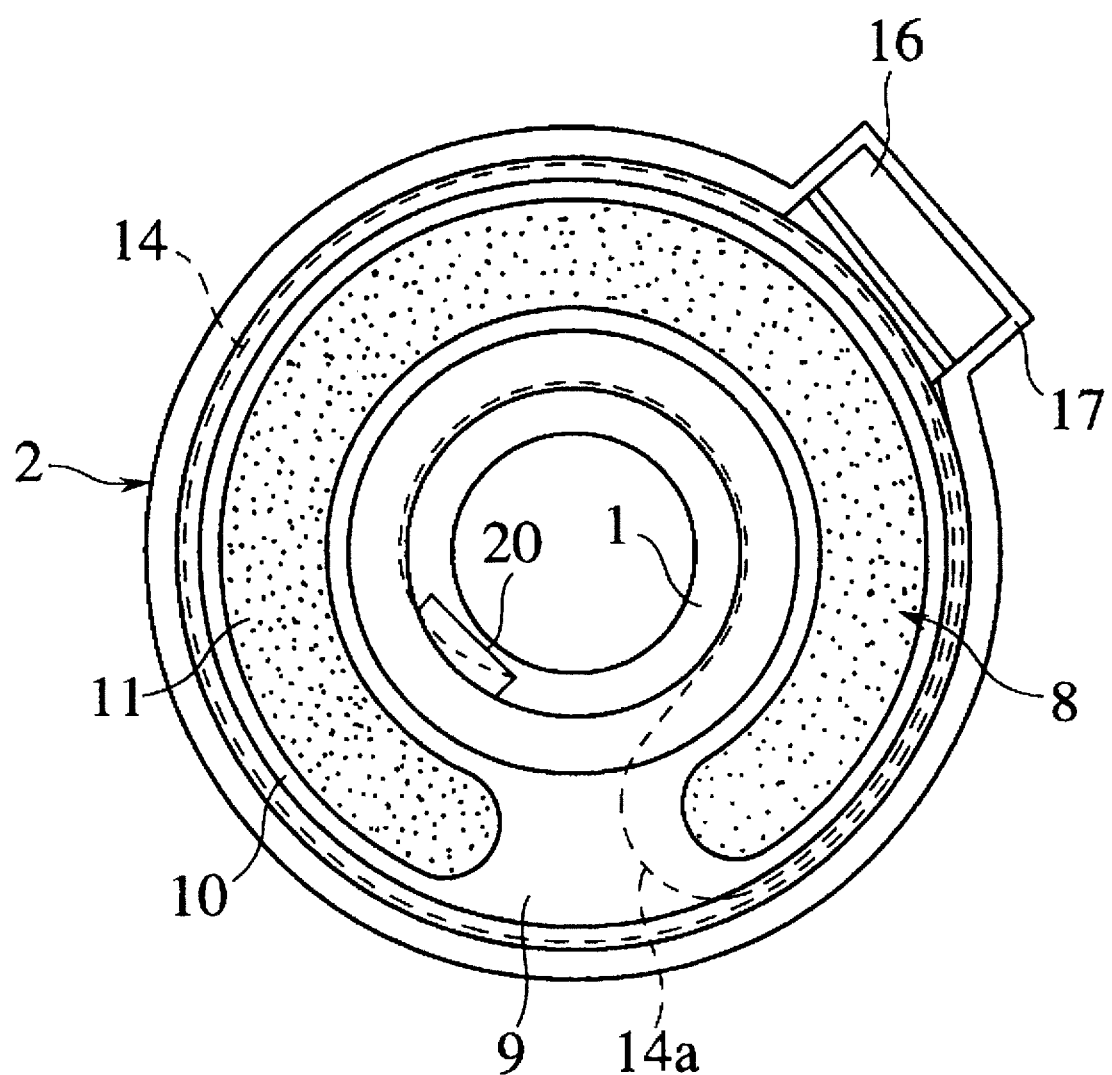
FIG. 1 is a plan view showing an apparatus for establishing the electrical connection between a rotor and a fixed member according to a first embodiment of the present invention in a state where the upper portion of the apparatus is opened.
Figure 2:
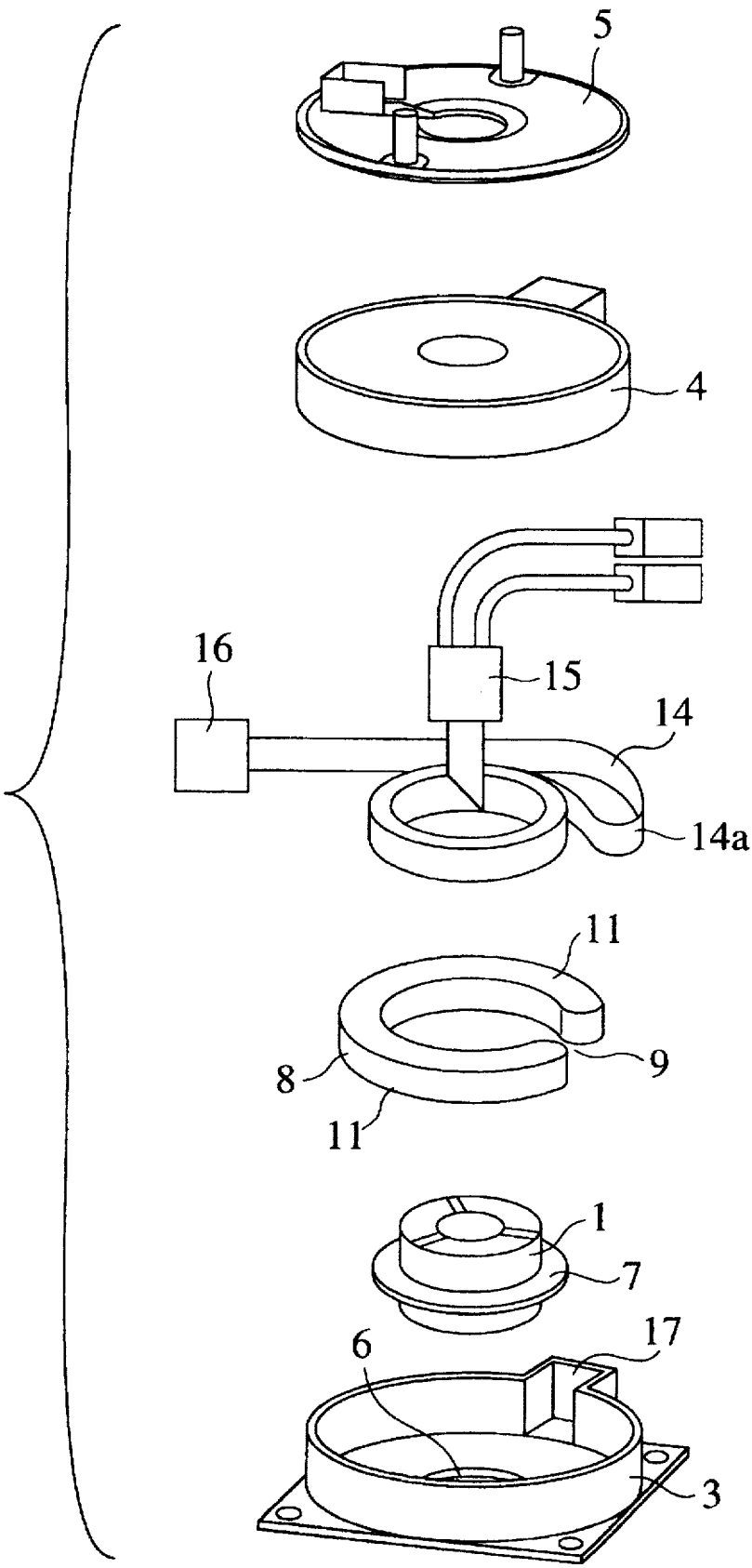
FIG. 2 is an exploded perspective view showing the apparatus for establishing the electrical connection between a rotor and a fixed member shown in FIG. 1.
Figure 3:
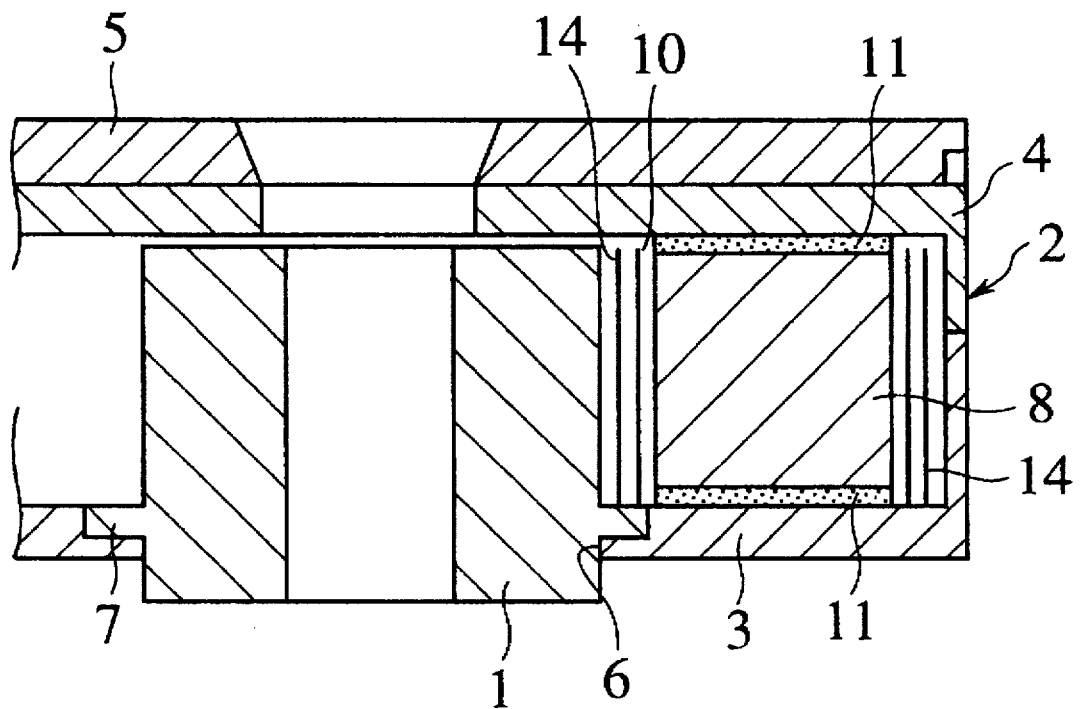
FIG. 3 is a cross sectional view showing an essential portion of the apparatus for establishing the electrical connection between a rotor and a fixed member shown in FIG. 1.
Figure 4:
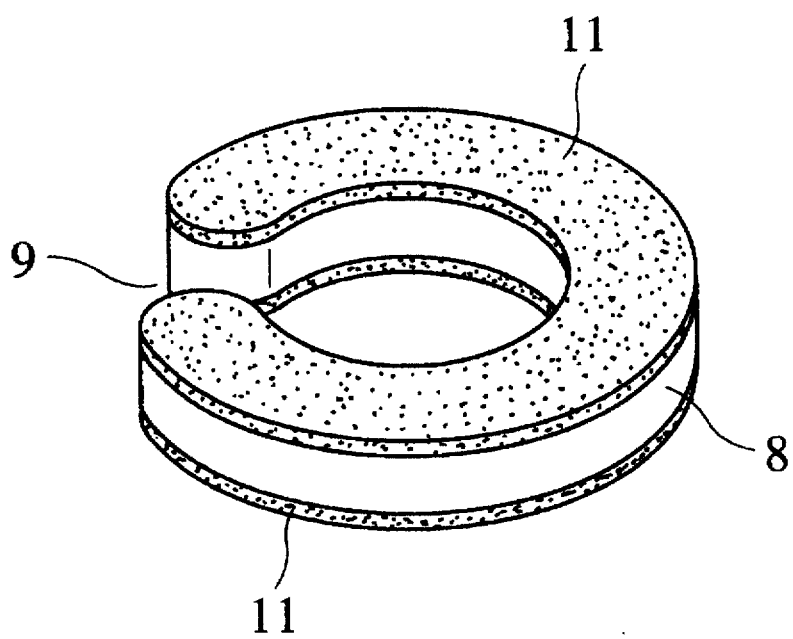
FIG. 4 is a perspective view showing a movable member for use in the apparatus for establishing the electrical connection between a rotor and a fixed member shown in FIG. 1.

FIG. 1 is a plan view showing an apparatus for establishing the electrical connection between a rotor and a fixed member according to the present invention in a state where the upper portion of the apparatus is opened. FIG. 2 is an exploded perspective view showing the apparatus for establishing the electrical connection between the rotor and the fixed member. FIG. 3 is a vertical cross sectional view of an essential portion of the apparatus. FIG. 4 is a perspective view showing a carrier.

Referring to FIGS. 1 to 3, a rotor 1 into which the steering shaft of an automobile is inserted and to which the same is secured is disposed in the central portion. A housing 2, which is a fixed member to be secured to a steering column portion (not shown), consists of an under cover 3 having an opening 6 for rotatively supporting the rotor 1, a cover 4 mounted on the under cover 3, and an upper cover 5 mounted on the cover 4 (see FIG. 2). The rotor 1 is inserted into the opening 6 so as to be received on the inner surface of the under cover 3 by a flange 7 (see FIG. 3).

A carrier 8, which is the movable member, has a C-shape annular shape in a plan view having an opening portion 9 formed therein, the carrier 8 being disposed in an annular space 10 formed between the housing 2 and the rotor 1 in such a manner that the carrier 8 is able to be rotated and moved.

The upper and lower sliding surfaces of the carrier 8 have, as shown in FIGS. 3 and 4, lubricating means 11. The lubricating means 11 is formed by coating synthetic resin, such as Teflon resin, fluororesin or silicon resin or by applying lubricating sheets made of the foregoing synthetic resin.

As shown in FIG. 1, a flexible flat cable (hereinafter abbreviated as an "FFC") 14 is attached in such a manner that an inner-end connection housing 15 (see FIG. 2) disposed at an end of the inner portion is secured to a fixed portion 20 of the rotor 1; and the FFC 14 drawn from the inner-end connection housing 15 is wound around the outer surface of the rotor 1, followed by forming an inversion portion 14a which is allowed to pass through the opening portion 9 of the carrier 8. Then, the FFC 14 is wound around the inner surface of the housing 2 in a direction opposite to the direction in which the same is wound around the outer surface of the rotor 1. A connector 16 attached to the leading end of the FFC 14 is attached and secured to an expansion portion 17 of the under cover 3.

According to the structure of the first embodiment, when the rotor 1 is rotated clockwise when viewed in FIG. 1, the portion of the FFC 14 wound around the outer surface of the rotor 1 is unwound, and then wound around the inner surface of the housing 2. At this time, the inversion portion 14a mutually rotates with respect to the rotor 1 and moves in the annular space 10 in the same direction as the rotor 1 in a decelerated state. When the inversion portion 14a moves, the carrier 8 is pushed by the outer surface of the inversion portion 14a so that the inversion portion 14a is rotated and moved in the same direction as the carrier 8.

The counterclockwise rotation of the rotor 1 when viewed in FIG. 1 results in unwinding of the portion of the FFC 14 wound around the inner surface of the housing 2. The unwound portion is wound around the outer surface of the rotor 1. At this time, the carrier 8 is pushed by the inner surface of the inversion portion 14a so as to be rotated and moved in the same direction as the rotor 1.

When the carrier 8 is rotated and moved, the lubricating means 11 slides along the upper and lower surfaces of the housing 2. The lubricating means 11 enables the sliding frictional resistance generated when the carrier 8 is rotated and moved to be weakened.

Figure 5:
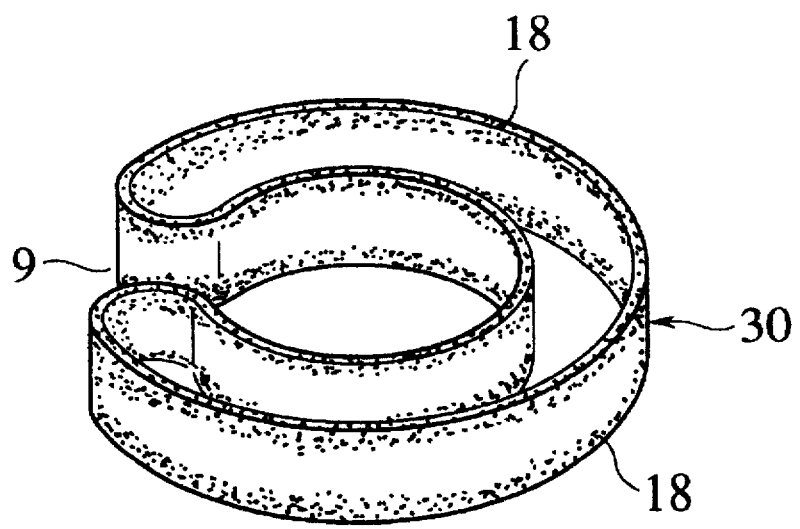
FIG. 5 is a perspective view showing a movable member for use in an apparatus for establishing the electrical connection between a rotor and a fixed member according to a second embodiment of the present invention.
Figure 6:
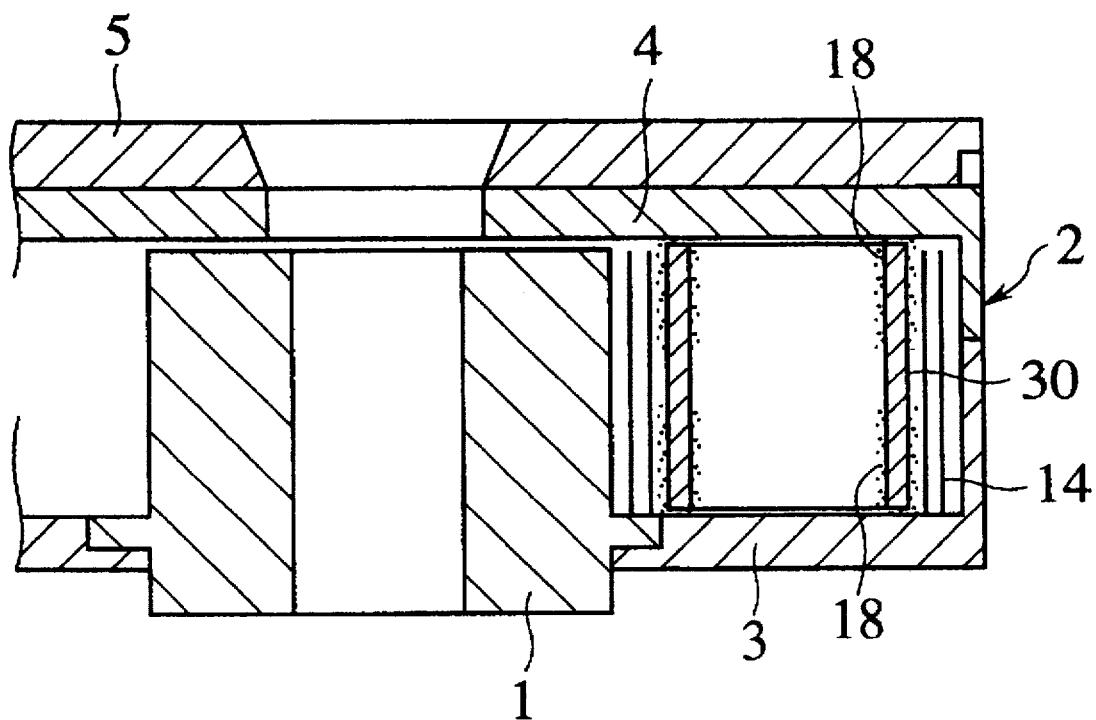
FIG. 6 is a cross sectional view showing an essential portion of the apparatus for establishing the electrical connection between a rotor and a fixed member shown in FIG. 5.

FIGS. 5 and 6 show a second embodiment of the apparatus for establishing the electrical connection between the rotor and the fixed member according to the present invention. A carrier 30 is formed into a hollow annular shape composed of a plate-like wall. The top and bottom ends of the carrier 30 are coated with lubricating members 18 made of the foregoing synthetic resin having the lubricating function. In the second embodiment, the lubricating members 18 slide along the upper and lower surfaces of the housing 2, as shown in FIG. 6. Since the lubricating members 18 are light and each having a small area of contact as compared with the carrier 8, the surface of which is brought into contact with the housing 2, the carrier 30 can be rotated and moved more smoothly.

Figure 7:
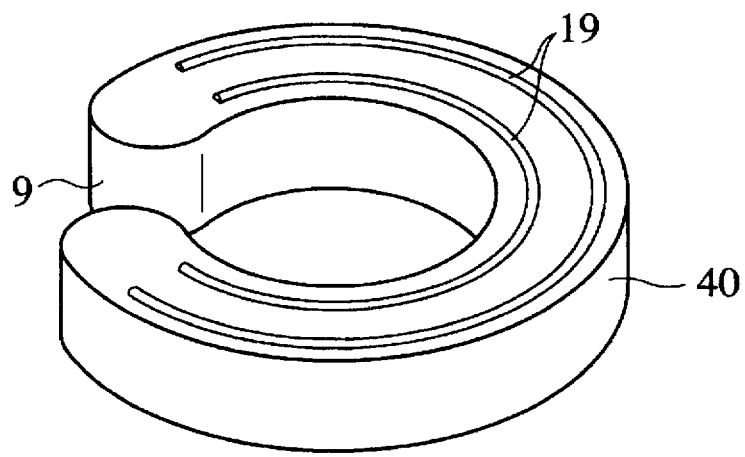
FIG. 7 is a perspective view showing a movable member for use in an apparatus for establishing the electrical connection between a rotor and a fixed member according to a third embodiment of the present invention.
Figure 8A:
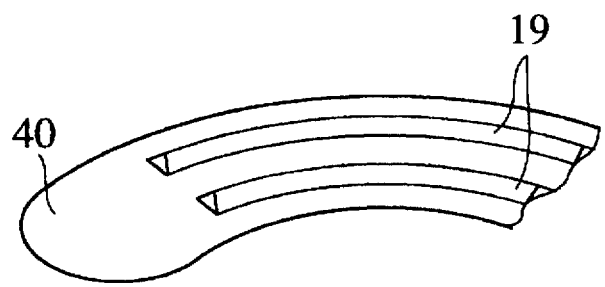
FIG. 8A shows one modification of ribs of the movable member shown in FIG. 7, each having a triangular cross sectional shape.
Figure 8B:
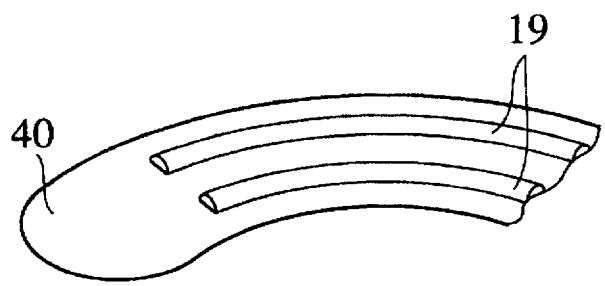
FIG. 8B shows the other modification of ribs of the movable member shown in FIG. 7, each having a semicircular cross sectional shape.
Figure 8C:
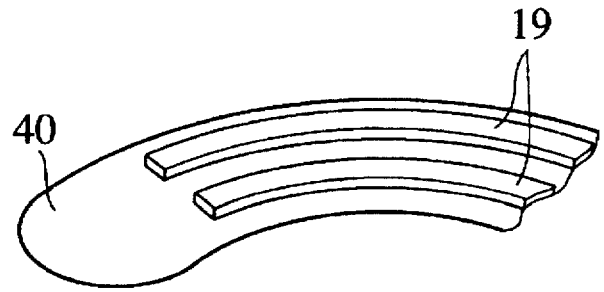
FIG. 8C shows the other modification of ribs of the movable member shown in FIG. 7, each having a rectangular cross sectional shape.
Figure 9:
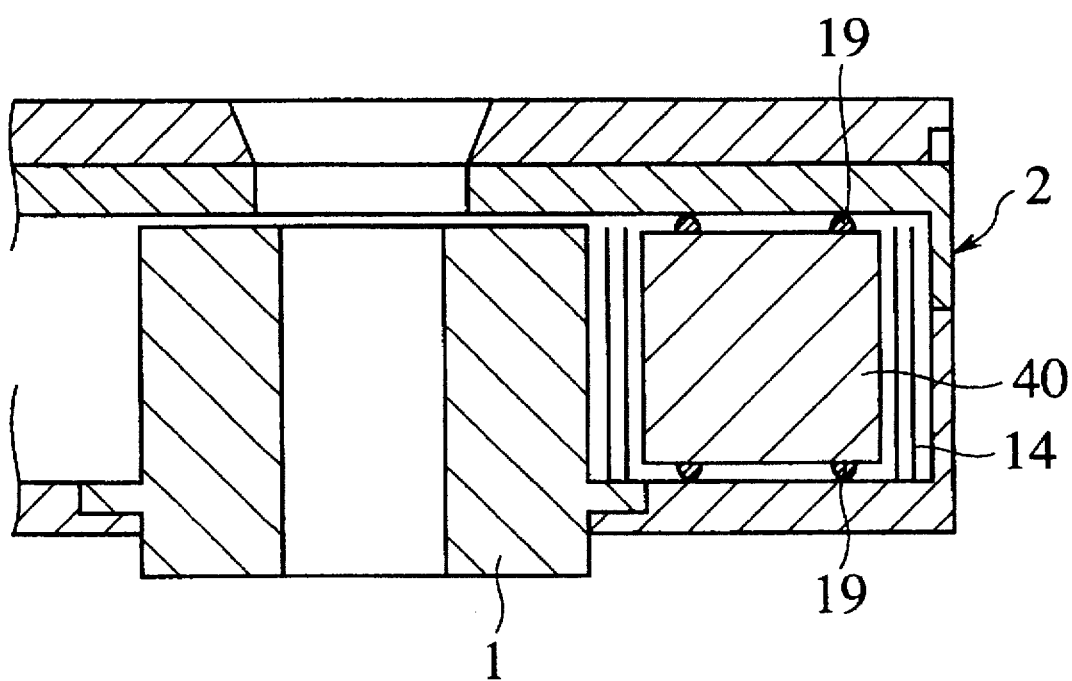
FIG. 9 is a cross sectional view showing the apparatus for establishing the electrical connection between a rotor and a fixed member shown in FIG. 7.

FIGS. 7, 8 and 9 show a third embodiment of the apparatus for establishing the electrical connection between the rotor and the fixed member according to the present invention. The third embodiment has a structure such that the upper and lower surfaces of a carrier 40 have a rib 19 made of the foregoing resin lubricating material. The rib 19 comprises one or more ribs and formed concentrically with the carrier 40. In the case where the plural ribs 19 are formed, it is preferable that the two ends of each of the ribs 19 are not connected but they are made to be discontinuous. The reason for this is that the sliding resistance generating when the carrier 40 is rotated must be weakened.

The cross sectional shape of the rib 19 may be any one selected from a group consisting of a triangular shape as shown in FIG. 8A, a semicircular shape as shown in FIG. 8B and a trapezoidal or a quadrilateral shape shown in FIG. 8C. The rib 19 is formed by any one of the following method, for example.

(a) The body of the carrier 40 is formed by the lubricating material; and ribs are, by molding, formed on the upper and lower surfaces of the carrier 40.

(b) Ribs are formed on the upper and lower surfaces of the carrier 40 by molding. The rib portions or the overall surface of the carrier 40 is coated with the lubricating material.

(c) Tapes made of the lubricating material are applied to the upper and lower surfaces of the carrier 40 so as to form ribs.

(d) A lubricating sheets having ribs formed thereon are applied to the surfaces of the carrier 40.

According to the third embodiment, when the carrier 40 is moved, the ribs 19 slide on the upper and lower surfaces of the housing 2 in a line contact manner, as shown in FIG. 9. Since the ribs 19 are positioned concentrically with the carrier 40, sliding resistance generating when the carrier 40 is rotated and moved can further be weakened.

What is claimed is:

1. An electrical connection apparatus comprising:

a fixed member defining a housing;

a rotor rotatably disposed in said housing;

a flexible flat cable, having a first end secured to said housing and a second end secured to said rotor, accommodated in an annular space defined between said housing and said rotor, a direction of winding of said flat cable being, at an intermediate inversion portion thereof, inverted such that said flat cable is wound around an outer surface of said rotor and then around an inner surface of said housing; and a movable member disposed in said annular space, arranged to be rotated with respect to said rotor due to movement of the inverse portion in a circumferential direction caused by winding of said cable, said movable member including a wall formed into an annular shape defining a hollow portion within the wall, said annular shape having an opening allowing the inverse portion of said cable to pass therethrough, the wall surrounding the hollow portion having upper and lower surfaces contacting said housing, and at least one of the upper and lower surfaces having a lubricating member.

2. An electrical connection apparatus according to claim 1, wherein said lubricating means is provided for each of said upper and lower surfaces of said movable member.

3. An electrical connection apparatus according to claim 1, wherein said lubricating means is formed by coating with a lubricating material or by applying lubricating sheets.

4. An electrical connection apparatus according to claim, wherein said lubricating means consists of one or more ribs formed concentrically with said movable member.

5. An electrical connection apparatus comprising:

a fixed member defining a housing;

a rotor rotatably disposed in said housing;

a flexible flat cable, having a first end secured to said housing and a second end secured to said rotor, accommodated in an annular space defined between said housing and said rotor, a direction of winding of said flat cable being, at an intermediate inversion portion thereof, inverted such that said flat cable is wound around an outer surface of said rotor and then around an inner surface of said housing; and a movable member disposed in said annular space, arranged to be rotated with respect to said rotor due to movement of the inverse portion in a circumferential direction caused by winding of said cable, said movable member formed into an annular shape having an opening allowing the inverse portion of said cable to pass therethrough, said movable member having upper and lower surfaces, at least one of the upper and lower surfaces having a rib contacting said housing, said rib formed concentrically with said movable member, and said rib being coated with a lubricating material.

* * * * *